(12) United States Patent
Jainek

(10) Patent No.: US 6,994,784 B2
(45) Date of Patent: Feb. 7, 2006

(54) LIQUID FILTER/HEAT EXCHANGER UNIT

(75) Inventor: Herbert Jainek, Heilbronn (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/670,761

(22) Filed: Sep. 26, 2003

(65) Prior Publication Data

US 2004/0182566 A1    Sep. 23, 2004

(30) Foreign Application Priority Data

Sep. 26, 2002    (DE) ............................... 102 45 005

(51) Int. Cl.
*B01D 35/02*    (2006.01)
*B01D 35/147*    (2006.01)

(52) U.S. Cl. ..................... 210/149; 210/168; 210/175; 210/186; 210/254; 210/DIG. 17; 165/279; 165/51; 165/119; 165/916; 236/34.5; 184/6.22; 184/6.24; 184/104.2; 123/41.33; 123/196 A; 123/196 AB

(58) Field of Classification Search ................ 210/168, 210/175, 181, 184, 186, 254, 416.5, DIG. 17; 165/279, 280, 286, 297, 300, 51, 119, 916; 236/34.5; 184/6.22, 104.1, 104.2, 104.3
See application file for complete search history.

(56) References Cited

U.S. PATENT DOCUMENTS

| | | | | |
|---|---|---|---|---|
| 2,729,339 A | * | 1/1956 | McCoy | 210/90 |
| 3,743,011 A | * | 7/1973 | Frost | 165/283 |
| 4,638,856 A | * | 1/1987 | Yamanaka et al. | 165/119 |
| 4,669,532 A | * | 6/1987 | Tejima et al. | 165/297 |
| 4,783,271 A | * | 11/1988 | Silverwater | 210/742 |
| 5,014,775 A | * | 5/1991 | Watanabe | 165/167 |
| 5,236,043 A | * | 8/1993 | Armbruster et al. | 165/167 |
| 5,406,910 A | * | 4/1995 | Wallin | 123/41.33 |
| 5,575,329 A | * | 11/1996 | So et al. | 165/167 |
| 2004/0182566 A1 | * | 9/2004 | Jainek | 165/300 |

* cited by examiner

*Primary Examiner*—Robert James Popovics
(74) *Attorney, Agent, or Firm*—Crowell & Moring LLP

(57) ABSTRACT

A liquid filter/heat exchanger unit including a liquid filter and a heat exchanger, the liquid filter having a filter element in a filter housing. To bypass the heat exchanger, there is a bypass connecting the heat exchanger inlet directly to the unfiltered side of the filter element. A switching element is provided to control the liquid flow into the heat exchanger or into the bypass. The switching element is a bimetal element which is in a position directing the liquid flow into the bypass at a temperature below a switching temperature.

6 Claims, 2 Drawing Sheets

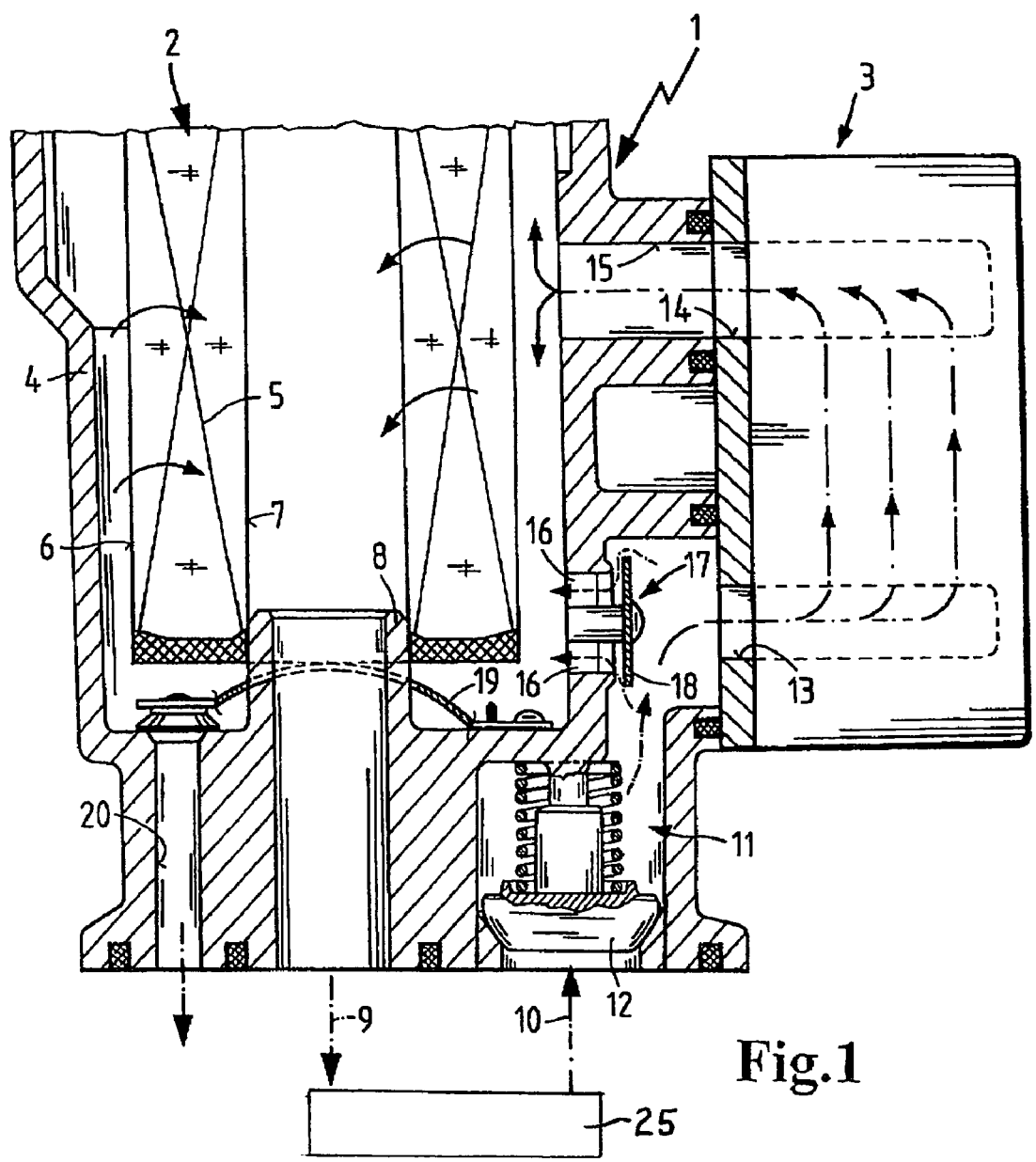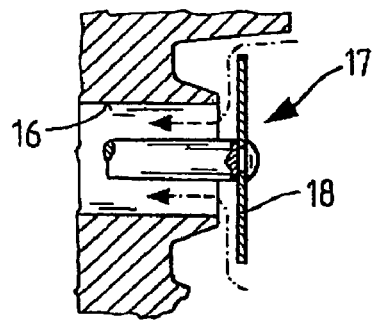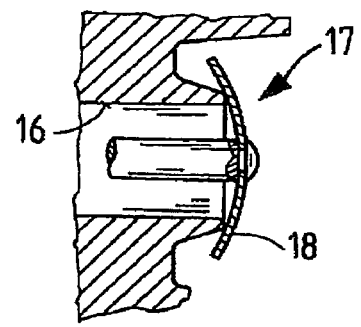

LIQUID FILTER/HEAT EXCHANGER UNIT

BACKGROUND OF THE INVENTION

The present invention relates to a liquid filter/heat exchanger unit, in particular for motor vehicles, comprising a liquid filter with a filter element in a filter housing, a heat exchanger with a liquid inlet and outlet, the unfiltered liquid side of the filter element communicating with the heat exchanger outlet; a bypass which bypasses the heat exchanger and connects the heat exchanger inlet directly to the unfiltered liquid side of the filter element, and a switching element for controlling liquid flow into the heat exchanger and/or the bypass.

To cool the oil in internal combustion engines, a liquid filter/heat exchanger unit is flange-mounted on the engine block, so that the oil required for lubricating the engine can be cleaned and cooled. The liquid filter/heat exchanger unit comprises a liquid filter having a filter element situated in a filter housing and a heat exchanger connected to the filter housing. The entire unit is flange-mounted on the engine block, so that the unfiltered, hot raw oil from the engine block first goes through an inlet in the liquid filter/heat exchanger unit into the heat exchanger, where it is cooled and then is passed to the unfiltered oil side of the filter element and is cleaned in the filter element. The cooled and cleaned oil from the clean side of the filter element then is reintroduced into the oil circuit in the engine block.

In a cold start, particularly at very cold temperatures, in order to prevent the dirty oil entering the heat exchanger from clogging it due to its increased viscosity at low temperatures and thus interfering with steady-state flow through the heat exchanger, a bypass branches off from the heat exchanger inlet directly to the unfiltered side of the filter element. In this bypass there is a bypass valve, which is in the closed position at the regular operating temperature and thus obstructs the bypass but opens at low temperatures, so that the dirty oil bypasses the heat exchanger and is sent directly to the unfiltered side of the filter element.

The switching function of the bypass valve is usually controlled based on the pressure in the inlet, which increases when there is blockage of the oil in the heat exchanger. If the pressure exceeds an allowed limit value, the bypass valve is opened and the dirty oil can flow directly to the unfiltered side of the filter element. This prevents clogging of the heat exchanger and also facilitates faster heating of the oil.

SUMMARY OF THE INVENTION

Accordingly, it is the object of the present invention to provide an improved liquid filter/heat exchanger unit.

Another object of the invention is to provide a liquid filter/heat exchanger unit with a simple design.

A further object of the invention is to provide a liquid filter/heat exchanger unit which functions in a temperature dependent manner without any controlling intervention from the outside.

An additional object of the invention to provide a liquid filter/heat exchanger unit in which the heat exchanger is shut down at low temperatures and is bypassed by the liquid stream to be cleaned.

It is also an object of the invention to provide a liquid filter/heat exchanger unit from which the oil will drain without an external intervention when the oil in the engine is changed.

These and other objects are achieved in accordance with the present invention by providing a liquid filter/heat exchanger unit comprising a liquid filter comprising a filter element arranged a filter housing to divide an unfiltered liquid area from a filtered liquid area; a heat exchanger having an inlet and an outlet for a liquid, the outlet communicating with the unfiltered liquid area of the liquid filter; a heat exchanger bypass which connects the inlet of the heat exchanger directly to the unfiltered liquid area of the liquid filter; and a switching element for controlling liquid flow through the bypass; wherein the switching element comprises a bimetal element which permits liquid flow through the bypass at temperatures at or below a switching temperature and blocks liquid flow through the bypass at temperatures above the switching temperature.

In the inventive liquid filter/heat exchanger unit, the switching element is situated in the inlet to the heat exchanger and regulates the liquid flow into the heat exchanger or alternatively into the bypass, which leads directly from the inlet to the unfiltered side of the filter element of the liquid filter, bypassing the heat exchanger. According to this invention, the switching element comprises a bimetal element, which is automatically adjusted between two switch positions when the temperature rises above or falls below a specific switching temperature.

In a first switch position, assumed by the bimetal element below its switching temperature, the liquid stream or a portion of the liquid stream is directed through the bypass to the unfiltered side of the filter element, bypassing the heat exchanger. However, in the second switch position assumed by the bimetal element above the switching temperature, the entire liquid stream is advantageously directed into the heat exchanger. This second switch position corresponds to normal operation of the internal combustion engine.

With this design as a bimetal element, automatic temperature-dependent switching of the switching element is achieved. No external intervention to implement the switching operation is necessary. The switching temperature can be adjusted to the particular intended purpose through an appropriate design of the bimetal element. For example, for an oil filter/heat exchanger unit for filtering and cooling motor oil in internal combustion engines or transmission oil, the switching temperature may be in a temperature range from approximately 40° C. to 80° C. Below this temperature, the bimetal element is in a position which opens the bypass, so that the incoming dirty oil is sent directly to the filter element, bypassing the heat exchanger.

Since the switching operation in the bimetal element takes place independently of the operating state of the internal combustion engine, the bimetal element is not only in a position which bypasses the heat exchanger after a cold start at low outside temperatures, but it is also below the switching temperature after the internal combustion engine has been turned off and the liquid to be cleaned has cooled. This has the advantage that after the temperature drops below the switching temperature when the engine is shut down, the bimetal element is automatically in a position which opens the bypass, and all the liquid can drain out of the heat exchanger through the bypass when maintenance is performed. In the case of an oil filter and oil heat exchanger, this greatly simplifies an oil change because almost all the remaining oil is removed from the system.

In accordance with one advantageous embodiment of the invention, the bimetal element is situated directly at the bypass, in particular in the area of the bypass opening to the inlet to the heat exchanger. Below the switching temperature, the bimetal element is in the open position, but above the switching temperature it is in the closed position so that the liquid flow goes exclusively into the heat exchanger.

In accordance with another advantageous embodiment of the invention, the bimetal element may provided directly as part of the heat exchanger, in which case the bypass is advantageously also a component of the heat exchanger and in particular is integrated into an intermediate plate arranged between a base plate (e.g., a mounting plate of the heat exchanger) and the heat exchanger housing. Again in this case, the bimetal element is open below the switching temperature so that at least a substream of the liquid goes directly to the unfiltered oil side of the filter, bypassing the heat exchanger. Above the switching temperature, the bimetal element is closed, and the entire liquid flow is passed through the heat exchanger.

However, it may optionally also be advantageous to provide one bimetal element at the inlet opening to the heat exchanger and another bimetal element at the bypass, with each of these bimetal elements being switched at the same switching temperature but in opposite directions. This embodiment prevents any incorrect flows.

BRIEF DESCRIPTION OF THE DRAWINGS

The invention will be described in further detail with reference to illustrative preferred embodiments shown in the accompanying drawings, in which:

FIG. 1 is a sectional view through a liquid filter/heat exchanger unit, which may be flange-mounted on an engine block of an internal combustion engine for cleaning and cooling engine oil;

FIG. 2 is a detail view of a switching element designed as a bimetal element for regulating liquid flow through a heat exchanger bypass, with the bypass valve shown in the open position;

FIG. 3 is a detail view showing the bimetal element in the closed position;

DETAILED DESCRIPTION OF PREFERRED EMBODIMENTS

Figure 4:
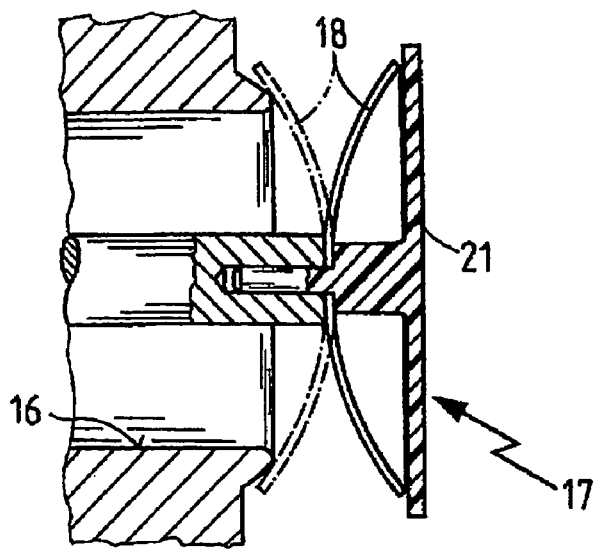
FIG. 4 shows another bimetal element, which is situated in the area of the inlet opening of the bypass and is downstream from a baffle plate.

The liquid filter/heat exchanger unit 1 shown in FIG. 1 is used for cooling and cleaning motor oil or transmission oil of an internal combustion engine 25 and comprises a liquid filter 2 and a heat exchanger 3. Although the liquid filter 2 and the heat exchanger 3 are designed as independent components, they are fixedly joined together. In a filter housing 4, the liquid filter 2 has a filter element 5, which is designed as a hollow cylinder whose radial outside forms the unfiltered liquid side 6 which is to receive the unfiltered liquid to be cleaned as an oncoming radial flow and whose cylindrical interior forms the clean or filtered liquid side 7 through which the cleaned liquid is discharged axially. The filter element 5 is inserted into a mounting space in the filter housing 4, the cylindrical interior of the filter element being placed on a housing connection 8 which is part of a drain pipe to drain the cleaned liquid in the direction of arrow 9 back to the oil circuit of engine 25.

The dirty liquid to be cleaned is conducted in the direction of arrow 10 from engine 25 into an inlet channel 11, which is provided in the filter housing 4 and in which there is a non-return valve 12 to prevent unwanted return flow of the liquid to be cleaned in the direction opposite the direction of arrow 10. The inlet channel 11 communicates with an inlet opening 13 in the heat exchanger 3 mounted on the side of the filter housing 4.

In regular operation—at temperatures above a switching temperature, i.e., the cutoff temperature of the liquid—the liquid to be cleaned flows through the inlet channel 11 and through the opening 13 into the heat exchanger 3, where it is cooled and then flows through an outlet opening 14 in the housing of the heat exchanger 3 and a connecting channel 15 in the filter housing into the outer annular space encompassing the filter element 5, striking the unfiltered liquid side 6 of the filter element radially. After flowing radially through the filter element, the cleaned and cooled liquid is discharged in the direction of arrow 9 through the clean side 7 and the housing connection 8 back to engine 25.

The inlet channel 11 is connected directly to the annular space encompassing the filter element 5 and the unfiltered liquid side 6 of the filter element via a bypass 16 in the wall of the filter housing—which in this illustrative embodiment is opposite the inlet opening 13 to the heat exchanger 3. The bypass opening is opened and closed by a switching element 17 provided in the area of the inlet channel 11. Switching element 17 comprises a bimetal element 18, which is adjusted between a closed position and an open position when the temperature respectively rises above or falls below a specific switching temperature.

In FIG. 1, the switching element 17 is shown in its open position in which the liquid flow or substream flowing into the inlet channel 11 passes directly through the bypass 16 to the unfiltered liquid side 6 of the filter element 5, bypassing the heat exchanger 3. This is the position assumed by the bimetal element below its specific switching temperature, which is 80° C., for example, in the case of oil filtering and/or oil cooling, to prevent the pressure in the heat exchanger from rising to an unacceptable level due to the increased viscosity of the liquid to be cleaned, which occurs at low temperatures, and possible blocking or clogging of the heat exchanger 3.

When the temperature exceeds the switching temperature, the bimetal element 18 is automatically switched to its second switch position, which corresponds to the closed position and in which the bypass 16 is shut off, so that the entire liquid flow passes through the opening 13 and through the heat exchanger 3.

At the bottom of the mounting space in the filter housing 4, which holds the filter element 5, an outlet channel 20 branches off. Outlet channel 20 is closed by a closing spring 19, which is acted upon axially from its end face, pushing it into its closed position when the filter element 5 is inserted. In this position, the outlet channel 20 is sealed. However, if the filter element 5 is removed from the mounting space in the filter housing 4, the closing spring 19 automatically moves into the open position because of its inherent tension, and the outlet channel 20 is opened. Then all of the liquid which is still in the mounting space of the filter housing 4 can flow out through the outlet channel 20.

Since the filter element is removed only when the internal combustion engine is turned off and the bimetal element 18 is in its open position due to the cooling of the liquid to a temperature below the switching temperature when the internal combustion engine is turned off, therefore, almost all the liquid content of the heat exchanger 3 is automatically drained through the bypass 16 and the outlet channel 20 out of the liquid filter/heat exchanger unit 1 after the internal combustion engine is turned off.

FIGS. 2 and 3 show enlarged diagrams of the switching element 17 with the bimetal element 18 at the opening of the bypass 16. According to FIG. 2, the bimetal element 18 is in its open position and the liquid can flow through the bypass 16 in the direction of the arrows shown in the drawing. This is the position assumed by the bimetal element 18 at a temperature below its switching temperature.

FIG. 3 shows the switching element 17 closed, with the bimetal element 18 closing the opening of the bypass 16, preventing any flow of liquid through the bypass 16. This is the position assumed by the bimetal element 18 at temperatures above its switching temperature.

In FIG. 4, a baffle plate 21 is affixed upstream of the bimetal element 18 of the switching element 17. Baffle plate 21 is constructed, for example, as a plastic disk, which should prevent the bimetal element 18 in the open position (shown with a solid line) from being entrained by the liquid flow and inadvertently moved into the closed position (shown with a broken line). If necessary, the baffle plate 21 may also assume the function of a mounting element for the bimetal element 18. The diameter of the baffle plate 21 is advantageously such that the bimetal element 18 is completely shielded by the baffle plate in the open position.

Figure 5:
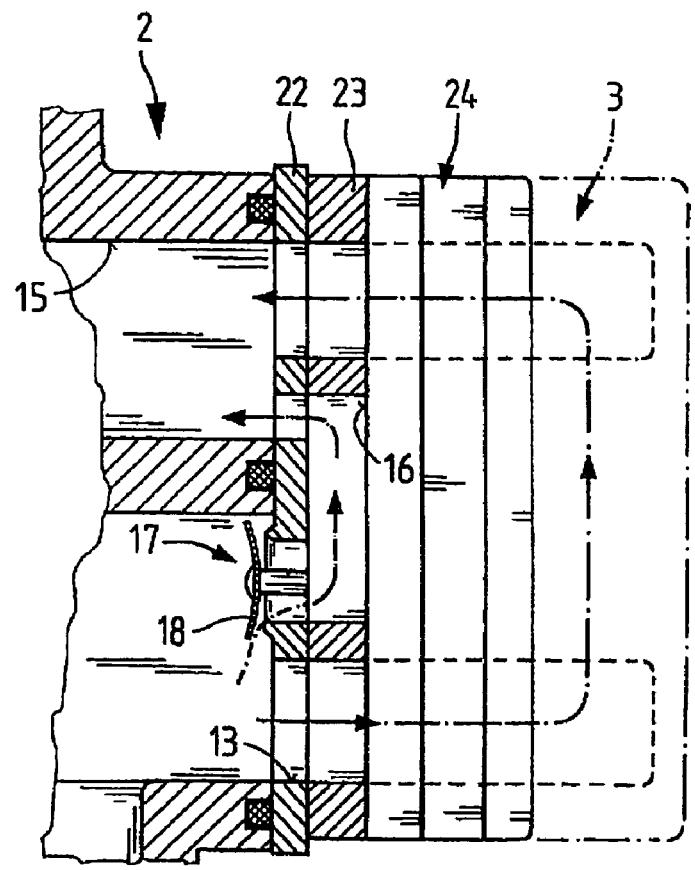
FIG. 5 shows a detail view of a heat exchanger having a base plate, and intermediate plate with a bypass and a heat exchanger housing.

In the embodiment according to FIG. 5, the heat exchanger 3 comprises a base plate, i.e., mounting plate 22, on which is placed an intermediate plate 23, which carries the heat exchanger housing 24. The bypass 16 is formed as a cutout in the intermediate plate 23, with the bimetal element 18 of the switching element 17 being situated in the area of the bypass inlet opening, which is situated in the base plate 22 and communicates with the inlet channel for the unfiltered oil. The bimetal element 18 is mounted on the base plate 22 and thus also on the heat exchanger 3.

Through the outlet opening of the bypass, which is also formed in the base plate 22, the bypass is connected to the connecting channel 15 to the unfiltered liquid side of the filter element in the liquid filter 2. At a temperature below the switching temperature, the bimetal element 18 is opened and at least a portion of the liquid flow can flow directly through the bypass 16 into the connecting channel 15, bypassing the heat exchanger elements of the heat exchanger 3.

At temperatures above the switching temperature, the bimetal element 18 is closed, so that the entire liquid flow is also passed through the heat exchanger 3 to cool it and thence also through the connecting channel 15 to the unfiltered liquid side of the filter element.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A liquid filter/heat exchanger unit comprising:
    a liquid filter comprising a filter element arranged in a filter housing to divide an unfiltered liquid area from a filtered liquid area;
    a heat exchanger having an inlet and an outlet for a liquid; said outlet communicating with the unfiltered liquid area of the liquid filter;
    a heat exchanger bypass which comprises an opening in the filter housing and connects the inlet of the heat exchanger directly to the unfiltered liquid area of the liquid filter; and
    a plate-shaped switching element for controlling liquid flow through said bypass; and
    a baffle plate constructed and arranged upstream of the bimetal element such that the baffle plate prevents the bimetal element in the open position from being entrained by the liquid flow and inadvertently moved into a closed position;
    wherein said switching element comprises a bimetal element which permits liquid flow through said bypass at temperatures at or below a switching temperature and blocks liquid flow through said bypass at temperatures above said switching temperature.

2. A liquid filter/heat exchanger unit according to claim 1, wherein the bimetal element is arranged where the bypass is connected to the inlet of the heat exchanger.

3. A liquid filter/heat exchanger unit according to claim 1, wherein said inlet comprises an inlet channel which communicates directly with the bypass and with the heat exchanger.

4. A liquid filter/heat exchanger unit according to claim 1, wherein said inlet and said filtered liquid area are connected to a lubricating oil circuit of an internal combustion engine.

5. A liquid filter/heat exchanger unit according to claim 1, wherein the plate-shaped switching element has a center and an outer edge, wherein the switching element is mounted at its center, and wherein the outer edge of the switching element bends towards the bypass at temperatures above the switching temperature to block liquid flow through said bypass.

6. A liquid filter/heat exchanger unit according to claim 5, wherein the outer edge of the switching element moves away from the bypass at temperatures at or below the switching temperature to allow liquid flow through said bypass.

* * * * *